United States Patent [19]

Kumar et al.

[11] Patent Number: 4,932,630
[45] Date of Patent: Jun. 12, 1990

[54] ELECTROPNEUMATIC VACUUM SUPPLY ASSEMBLY

[75] Inventors: Viraraghavan S. Kumar, Palm Bay; Philip S. Wise, Melbourne, both of Fla.

[73] Assignee: Teknocraft, Inc., Palm Bay, Fla.

[21] Appl. No.: 342,305

[22] Filed: Apr. 24, 1989

[51] Int. Cl.[5] .......................................... F16K 31/126
[52] U.S. Cl. .............................. 251/30.03; 251/30.05; 251/129.14
[58] Field of Search .............. 251/30.03, 30.05, 129.14

[56] References Cited

U.S. PATENT DOCUMENTS 2,398,775  4/1946  Beekley ..................... 251/30.03 X
2,573,369 10/1951  Snoddy ..................... 251/30.05
4,771,983  9/1988  Sakaguchi ................. 251/129.14 X

*Primary Examiner*—Robert G. Nilson
*Attorney, Agent, or Firm*—Charles E. Wands

[57] ABSTRACT

A vacuum control device is configured as an integrated assembly having a fluid inlet port, a fluid outlet port and a controlled vacuum output port, and houses both a venturi and solenoid-operated fluid-flow control valve unit. The valve unit has a fluid-flow chamber, in which a translatable spool valve element serves to control fluid communication between the fluid inlet port and the fluid inlet of the venturi. The output of the venturi is coupled by way of a fluid passageway to the outlet port, while a vacuum port of the venturi is coupled to a controlled vacuum output port. The valve unit contains a solenoid device, which is coupled with the translatable spool valve element, for controlling the displacement of the valve element and thereby fluid communication between the fluid inlet and the fluid outlet ports through the venturi. The solenoid-operated fluid-flow control valve unit preferably employs, as its movable armature, a steel bearing ball. The steel ball is supported for magnetic attraction by the solenoid coil against a stream of fluid (air) flowing through an interior bore in a translatable pole piece to which the operated valve element is attached.

7 Claims, 2 Drawing Sheets

ELECTROPNEUMATIC VACUUM SUPPLY ASSEMBLY

FIELD OF THE INVENTION

The present invention relates, in general, to pneumatic fluid-flow control systems, and is particularly directed to a fluid-flow control assembly in which an electropneumatic fluid-flow control valve and a venturi are integrated in a compact modular unit. In addition, the electropneumatic valve itself employs a new and improved structural configuration incorporating a steel bearing ball armature to facilitate low cost fabrication.

BACKGROUND OF THE INVENTION

Precision industrial pneumatic mechanisms, such as pneumatic gripping devices, typically employ some form of pneumatic or electropneumatic valve for controlling the flow of a working fluid (e.g. air in a vacuum system) to a controlled pressure region, such as a venturi associated with a vacuum pick-up head of a seizure/transport tool. One example of such a mechanism is the pneumatic vacuum gripper system described in my U.S. Pat. No. 4,750,768 issued June 14, 1988. In accordance with the structure and operation of the patented system, fluid-flow through a main venturi vacuum generator is selectively controlled, in order to ensure the application of a vacuum to a pick-up head as necessary to seize and grip an object.

In conventional industrial applications, the various units that make up an overall system are customarily stand alone devices interconnected using numerous 'plumbing' conduits and fixtures to realize an overall system functionality. While the availability of different types of parts from a variety of sources offers the system designer a wide choice of system configuration, the production of customized interface components is often required, which keeps costs high and often results in an implementation that suffers from weight and space penalties, thereby restricting multiple application usage.

SUMMARY OF THE INVENTION

In accordance with the present invention, the above-mentioned problems of conventional 'patch work' -configured pneumatic vacuum gripping systems are obviated by a new and improved electropneumatic device in which a vacuum head venturi and an associated electropneumatic fluid-flow control valve are integrated together in a compact modular assembly, that readily lends itself to a variety of gripping and transport applications without imposing space/weight constraints on the host industrial system. For this purpose, the inventive device is formed of a multiport modular unit, to which fluid supply, exhaust and vacuum lines may be coupled, for providing an electropneumatically-controlled vacuum to an attendant gripping head.

In particular, the device is configured as an integrated assembly having a fluid inlet port, a fluid outlet port and a controlled vacuum output port, and houses both a venturi and solenoid-operated fluid-flow control valve unit. The valve unit has a fluid-flow chamber, in which a movable valve element is disposed between, and in fluid communication with, the fluid inlet port and the fluid inlet of the venturi and serves to control fluid communication between the fluid inlet port and the fluid inlet of the venturi. The outlet of the venturi is coupled by way of a fluid passageway to the outlet port, while a vacuum port of the venturi is coupled to a controlled vacuum output port. The valve unit contains a solenoid device, which is coupled with the movable valve element, for controlling the displacement of the valve element and thereby fluid communication between the fluid inlet and the fluid outlet ports through the venturi. The solenoid-operated fluid-flow control valve unit preferably employs, as its movable armature, a ball made of ferromagnetic material, (e.g. a steel bearing ball). The steel ball is supported for magnetic attraction by the solenoid coil against a stream of fluid (air) flowing through an interior bore in a translatable pole piece to which the operated valve element is attached.

In particular, the fluid-flow control valve unit is formed in a housing containing an interior cylindrical chamber having a generally cylindrical side portion and first and second end portions. A first fluid communication port is coupled to the (cylindrical) side portion of the chamber, and a second fluid communication port is coupled to a first end portion of the chamber. The housing further contains an electromagnetic coil having a central cavity. A generally cylindrical magnetic pole piece, having a hollow bore, is disposed within the central cavity of the coil. A movable spool valve is supported for axial translation within the interior chamber and has a longitudinal bore for fluid communication between the second fluid communication port and the hollow bore of the magnetic pole piece. The spool valve is translatable between first and second positions within the interior chamber, such that, at its first position, the spool valve provides a fluid communication path between the first and second portions of the interior chamber and thereby provides fluid communication between the first and second fluid communication ports. At its second position, the spool valve interrupts the fluid communication path between the first and second portions of the interior chamber and thereby prevents fluid communication between the first and second fluid communication ports. One end of the spool valve is coupled to a diaphragm, which exposed to the hollow bore of the magnetic pole piece.

The movable steel ball armature is preferably a steel bearing ball disposed in an aperture in a valve plate adjacent to the hollow bore in the magnetic pole piece. The valve plate includes a fluid bleed-off passageway communicating between the aperture and the exterior of the housing. The steel ball armature restricts fluid flow through the bore in response to excitation of the electromagnetic coil. Specifically, the magnetic field produced by the coil causes the steel ball to be moved toward and in close proximity to the bore and thereby restrict the passage of fluid through the bore. As a consequence, there is a pressure build-up in the hollow bore of the magnetic pole piece above the diaphragm, causing a force differential to be established across the spool valve, thereby causing downward translation of the spool valve, so as to control the continuity of a fluid communication path between the first and second fluid communication ports.

Because of the extreme simplicity of the movable armature structure (a steel bearing ball) the solenoid unit may be easily incorporated within a compact or miniaturized housing structure that is inexpensive to manufacture.

DETAILED DESCRIPTION

Figure 1:
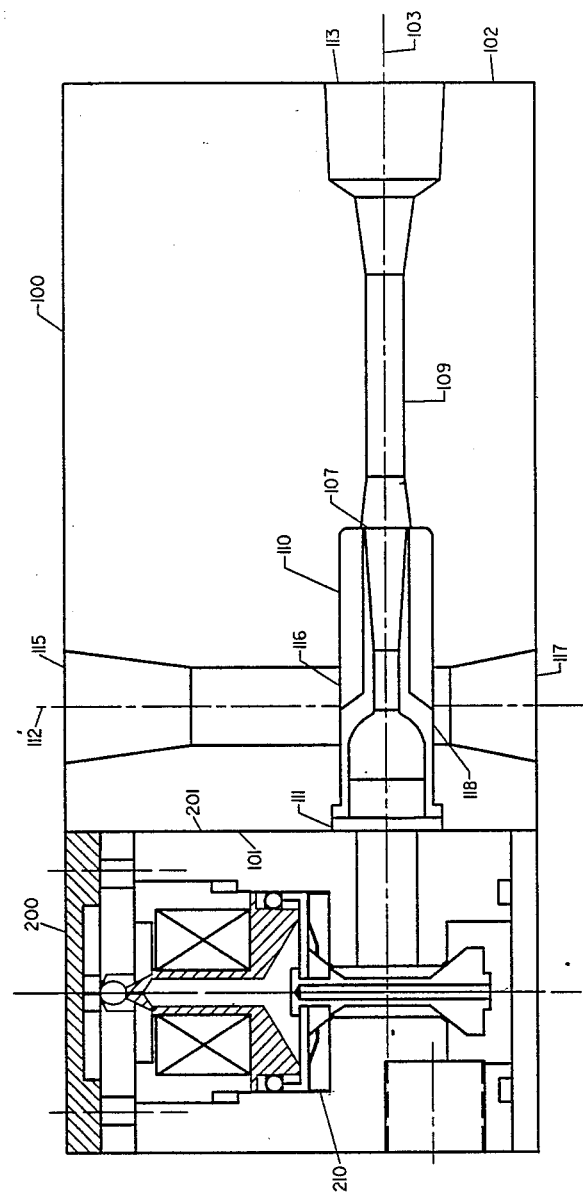
FIG. 1 is a diagrammatic side sectional view of an embodiment of an integrated electropneumatic valve and venturi assembly in accordance with the present invention.

Referring now to FIG. 1 of the drawings there is shown a diagrammatic side sectional view of an embodiment of an integrated electropneumatic valve and venturi assembly in accordance with the present invention. The assembly comprises a first housing generally block-rectangular portion 100, in which a venturi chamber 110 has been formed, and a second, adjoining generally block-rectangular housing portion 200, that contains a solenoid-operated valve unit 210. The configuration of venturi chamber 110 is conventional. However, as will be described below with reference to FIG. 2, the structure of solenoid-operated valve unit 210 incorporates a simplified armature configuration, specifically a steel ball armature, that facilitates manufacture of the valve unit as a compact modular assembly.

As noted above, each of housing portions 100 and 200 has a generally solid-rectangular or block configuration, so as to facilitate their separate construction and integral attachment along adjoining planar surfaces 101 and 201. Venturi-containing housing portion 100 has a venturi inlet port 111 bored into surface 101, coaxial with the longitudinal axis 103 of venturi chamber 110. The venturi has an outlet port 107 that is coupled through a coaxial bore 109 to an exhaust port 113, which bored into the planar end surface 102 of housing portion 100, opposite to planar end surface 101, and coaxial with longitudinal bore axis 103. Extending from parallel, traverse planar surfaces 104 and 106 of housing portion 100 are respective side ports 115 and 117 that extend along a transverse axis 112 to vacuum outputs 116 and 118 of the venturi. Each of vacuum ports 115 and 117 is internally threaded, so that it may be closed off, individually, by means of threaded cap or similar fitting.

Venturi 110 operates in a conventional manner. The degree of vacuum produced at a vacuum port (port 15) is dependent upon the fluid flow between fluid inlet 111 and fluid outlet 113. This fluid flow is controlled by an associated electropneumatic valve unit 210 contained within housing portion 200 and shown in detail in FIG. 2.

Figure 2:
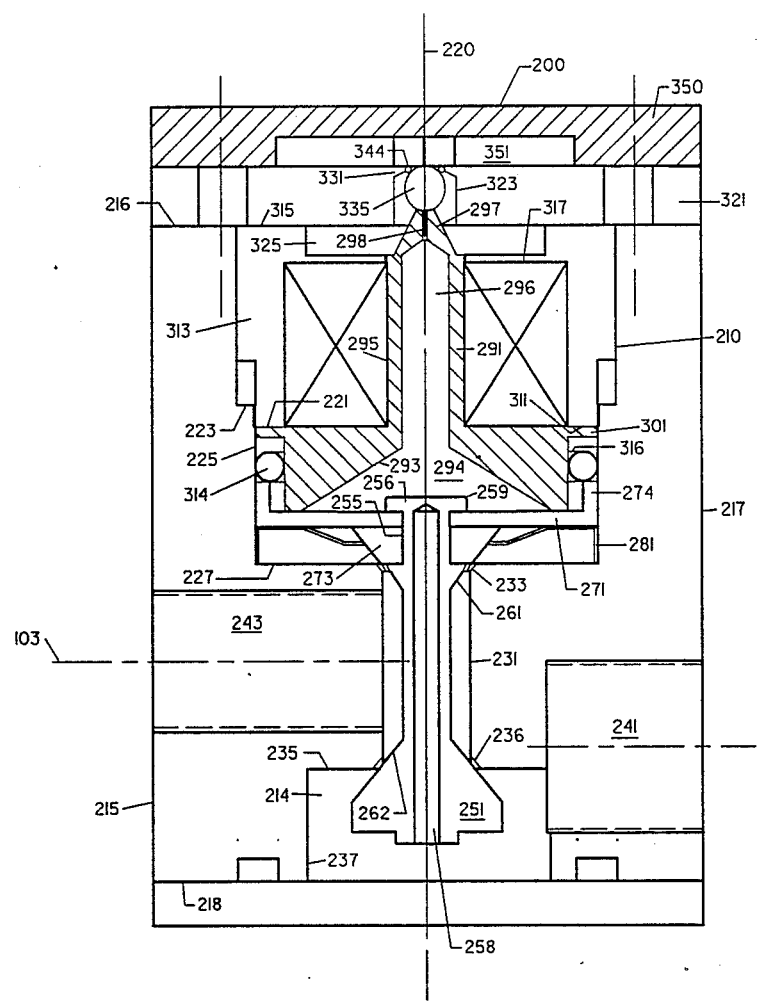
FIG. 2 is a side sectional view of the internal configuration of the valve unit of FIG. 1.

More particular, FIG. 2 is a side sectional view of the internal configuration of valve unit 210, showing the arrangement of the components of which the valve unit is formed. Except for the generally rectangular housing block itself, each of the components of valve unit 210, to be described below, is cylindrically symmetrical about its longitudinal axis 220. Thus, the side section view of FIG. 2 longitudinally bisects each of the components of the valve unit.

As pointed out above, to facilitate its unitary integration with venturi housing portion 100, valve unit 210 is preferably formed within a generally rectangular block-shaped housing 200. Housing 200 has a stepped cylindrical bore 214 which extends through the housing from a top surface 216 to a bottom surface 218 along longitudinal bore axis 220. A first portion 221 of bore 214 extends from surface 216 to a narrow annular land region 223, from which a second portion 225 of bore extends to a wide annular floor region 227. A cylindrical chamber 231 extends from a chamfered region 233 at the interior portion of floor region 227 to an annular land region 235. Annular land region 235 has a chamfered region 236, from which portion 237 of bore 214 extends to bottom surface 216.

A first, threaded cylindrical fluid inlet bore 241 extends from side surface 217 of housing 212 to overlap portion 237 of bore 214. Similarly, a second, threaded cylindrical fluid outlet bore 243 extends from side surface 215 of housing 212 to intersect and open into cylindrical chamber 231. Bore 241, which terminates at a bottom plate 242 at the bottom surface 218 of housing 200, provides a first (inlet) fluid communication passage between the side surface 217 of housing 212 and the lowermost bore portion 237 of valve unit 210. Bore 243 provides a second (outlet) fluid communication passage between the cylindrical chamber 231 of the valve unit and the side surface 215 of housing 200, and is arranged to be coaxial with inlet 111 of venturi chamber 110 within venturi housing 100.

Supported within and axially translatable within chamber 231 is a spool valve 251. Interior tapered portions 261 and 262 of spool valve 251 are sized and shaped to snugly seal the upper and lower chamfered regions 233 and 236 at the opposite ends of chamber 231. In addition, the length of spool valve 251 is slightly longer than the length of chamber 231, so that, when one of the upper and lower interior tapered portions 261 and 262 of the spool valve abuts against one of chamfered regions 233 and 236, there is a gap or opening around the spool valve and chamfered region at the opposite end of chamber 231. A narrow diameter cylindrical bore 258 extends the length of spool valve 251 to provide fluid communication between lowermost bore portion 237 and the interior of bore portion 225.

The top end 259 of spool valve 251 is mounted to a flexible diaphragm 271, an interior hub portion 273 of which is captured between a neck region 255 and a cap region 256 of the spool valve. Along the outer perimeter of diaphragm 271 is a rim region 274 which fits within bore portion 225 and rests upon a cylindrical spacer 281. Spacer 281 is inserted through the top of bore 214 and abuts against annular land region 235. Resting on the outer region of diaphragm 271 is a generally cylindrical inverted-T shaped magnetic pole piece 291 having a concave T portion 293 that forms an interior cavity or space 294 above diaphragm 271 and a longitudinal neck portion 295 which extend from the concave portion 293 to a tapered snout 297 that protrudes slightly above the plane of top surface 214 of housing 200. The neck portion 295 of pole piece 291 has a hollow cylindrical bore 296 which extends from cavity 294 to a narrow diameter hole 298 through snout 297, so that a continuous axial fluid communication passageway is provided through magnetic pole piece 291. Pole piece 291 also has a lip portion 301 that fits within bore portion 225 and upon which rests the bottom annular surface 311 of a coil casing 313. In addition, an O-ring 314 is captured between an annular ridge 316, the rim region 274 of diaphragm 271 and bore portion 225.

Like magnetic pole piece 291, casing 313 is formed of ferromagnetic material and is sized to fit within the upper portion 223 of bore 214. Casing 313 has its top annular surface 315 substantially flush with the top surface 214 of housing 212 and is recessed at an annular lip portion 317, which extends to the outer cylindrical surface of neck portion 295 of pole piece 291, so as to form, together with pole piece 291, a flux path and coil housing for an electromagnetic coil 320.

Flush-mounted with the top surface 214 of housing 212 is a valve plate 321, which has a central cylindrical aperture 323 that opens to a disk-shaped hollow region 325 defined by lip portion 317 of casing 313. The top portion of cylindrical aperture 323 is of reduced diameter, as defined by an annular lip portion 331 of valve plate 321, so as to limit the upward movement of a vertically translatable ball armature 335 that is confined within aperture 323 directly above the snout portion 297 of pole piece 291. Ball armature 335 is made of ferromagnetic material so as to form a high permeability flux path for the magnetic field produced by a magnetic coil 341 that is captured between casing 313 and pole piece 291. For this purpose, ball armature preferably comprises a steel bearing ball. As will be described below, steel ball armature 335 serves to controllably restrict fluid flow through bore 298 in response to excitation of the electromagnetic coil 341. Valve plate 321 further includes a fluid bleed-off passageway 344, that extends in a direction transverse to the plane of the Figure, between the aperture and the exterior of the housing. A cover 350 having a cavity 351 is mounted atop surface 216 of housing 200. Cavity 351 is contiguous with aperture 323 and cooperates with bleed-off passageway 344 as a fluid flow region through which air flow through bore 298 of pole piece 291 is vented to the atmosphere.

The electropneumatic valve operates as follows. When electromagnetic coil 341 is not excited, an upward fluid stream, originating via fluid inlet bore 241 through bore 214, spool valve 251 and pole piece 291, keeps ball 335 pushed against annular lip portion 331 of valve plate 321. As a consequence, the fluid pressure on the top side of diaphragm 271 is relatively low, so that the lower tapered portion 262 of spool valve 251 is urged upwardly against chamfered portion 236 of chamber 231, interrupting fluid communication between fluid inlet 241 and fluid outlet 243. When coil 341 is energized, its magnetic field through valve plate 321, ball 335 and pole piece 291 causes ball 335 to be attracted downwardly towards snout 297, thereby restricting or reducing (although not necessarily totally preventing) fluid flow through pole piece 291. Namely, the magnetic field produced by coil 341 causes ball 335 to be moved toward and in close proximity to bore 298, thereby restricting the flow of fluid through bore 258 in spool valve 251 and bore 296 through pole piece 291. As a result, there is a pressure build-up within the space 294 above diaphragm 271, thereby creating a downward-acting force differential across spool valve 251. This force differential causes a downward translation of spool valve 251 (and associated downward flexing of diaphragm 271), so that lower tapered portion 262 of spool valve 251 separates from chamfered portion 236 of chamber 231, thus allowing fluid communication through chamber 231 between fluid inlet 241 and fluid outlet 243. When coil 341 is deenergized, the downward magnetic attractive force on ball 335 is removed, thereby allowing ball 335 to 'float' upward on the fluid stream through bore 298 in snout 297. This allows a release of the pressure build-up above diaphragm 271, so that spool valve 251 returns to its previous position, blocking fluid flow between fluid inlet 241 and fluid outlet 243.

As will be appreciated from the foregoing description, the present invention provides an electropneumatic fluid flow control device in which a vacuum head venturi and an associated electropneumatic fluid-flow control valve are integrated together in a compact modular assembly, that readily lends itself to a variety of gripping and transport applications without imposing space/weight constraints on the host system. Because of the simplicity of the movable steel ball armature structure, the solenoid unit may be easily incorporated within a miniaturized housing structure that is relatively inexpensive to manufacture.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A solenoid-operated, fluid flow control valve comprising:

a housing having an interior chamber, a first fluid communication port coupled to a first portion of said interior chamber, and a second fluid communication port coupled to a second portion of said interior chamber, said housing further containing an electromagnetic coil having a longitudinal axis, and a central cavity coaxial therewith, for producing a magnetic field, said housing containing magnetic material for providing a flux path for said magnetic field;

a magnetic pole piece disposed within the central cavity of said electromagnetic coil, said magnetic pole piece having a hollow bore for allowing the passage of fluid therethrough;

a movable valve element disposed within said interior chamber between the first and second portions thereof and having a fluid passageway for providing a fluid communication path therethrough between said second fluid communication port and the hollow bore of said magnetic pole piece, and being movable between first and second positions within said interior chamber, such that, at its first position, said movable valve element provides a fluid communication path between said first and second portions of the interior chamber and thereby provides fluid communication between said first and second fluid communication ports, and at its second position, said movable valve element interrupts the fluid communication path between said first and second portions of the interior chamber and thereby prevents fluid communication between said first and second fluid communication ports, said movable valve element including a movable diaphragm exposed to the hollow bore of said magnetic pole piece; and a movable ball armature of magnetic material disposed adjacent to one end of the hollow bore through said magnetic pole piece and sized to restrict fluid flow through said one end of said hollow bore, so that in response to the excitation of said electromagnetic coil, the magnetic field produced thereby causes said movable ball armature to be moved toward said one end of said hollow bore and thereby restrict the passage of fluid through the hollow bore of said magnetic pole piece, such that a pressure build-up on the side of said diaphragm facing the hollow bore of said magnetic pole piece causes a force differential acting on said movable valve element and consequential translation of said movable valve element to provide fluid communication between said first and second communication ports.

2. A solenoid-operated, fluid flow control valve according to claim 1, further including a valve plate, containing magnetic material and having an aperture sized to accommodate said movable ball armature therein, said valve plate being disposed adjacent to said one end of said magnetic pole piece such that said aperture is adjacent to said one end of the hollow bore through said magnetic pole piece, and further including a fluid bleed-off passageway communicating between said aperture and the exterior of said housing.

3. A solenoid-operated, fluid flow control valve according to claim 1, wherein said movable valve element includes a fluid flow restriction element, coupled to said diaphragm and having said fluid flow passage therethrough, and being translatable from said second position to said first position within said interior chamber by a differential force acting across said fluid flow restriction element in response to a pressure build-up on the side of said diaphragm facing said hollow bore.

4. A solenoid-operated, fluid flow control valve according to claim 3, wherein said fluid flow restriction element comprises a spool element having said fluid flow passage therethrough along a longitudinal axis thereof.

5. A solenoid-operated, fluid flow control valve according to claim 1, wherein said magnetic pole piece has a tapered tip portion through which said hollow bore extends and adjacent to which said movable ball armature is located.

6. A solenoid-operated, fluid flow control valve comprising:
   a housing containing an interior chamber having a generally cylindrical sidewall portion and first and second end portions, a first fluid communication port coupled to a first end portion of said chamber and a second first fluid communication port coupled to a sidewall portion of said interior chamber, said housing further containing an electromagnetic coil having a longitudinal axis, and a central cavity coaxial therewith, for producing a magnetic field, said housing containing magnetic material for providing a flux path for said magnetic field;
   a generally cylindrical magnetic pole piece disposed within the central cavity of said electromagnetic coil, said magnetic pole piece having a hollow bore for allowing the passage of fluid therethrough;
   a movable valve element supported for axial movement within said interior chamber and having a fluid passageway therethrough for providing a fluid communication path between said second fluid communication port and the hollow bore of said magnetic pole piece, and being movable between first and second positions within said interior chamber, such that, at its first position, said movable valve provides a fluid communication path between said sidewall and first end portions of the interior chamber and thereby provides fluid communication between said first and second fluid communication ports, and at its second position, said movable valve interrupts the fluid communication path between said sidewall and first end portions of the interior chamber and thereby prevents fluid communication between said first and second fluid communication ports, said movable valve including a movable spool element extending axially within said interior chamber and a diaphragm coupled thereto, said diaphragm being exposed to the hollow bore of said magnetic pole piece;
   a movable ball armature of magnetic material disposed adjacent to one end of the hollow bore through said magnetic pole piece and sized to restrict fluid flow through said one end of said hollow bore, so that in response to the excitation of said electromagnetic coil, the magnetic field produced thereby causes said movable ball armature to be moved toward and in close proximity to said one end of said hollow bore and thereby restrict the passage of fluid through the hollow bore of said magnetic pole piece, so that a pressure build-up is established on the side of said diaphragm facing the hollow bore of said magnetic pole piece, causing a force differential across said movable valve element to control the continuity of a fluid communication path between said first and second fluid communication ports.

7. A solenoid-operated, fluid flow control valve according to claim 6, further including a valve plate, containing magnetic material and having an aperture sized to accommodate said movable ball armature therein, said valve plate being disposed adjacent to said one end of said magnetic pole piece such that said aperture is adjacent to said one end of the hollow bore through said magnetic pole piece, and further including a fluid bleed-off passageway communicating between said aperture and the exterior of said housing.

* * * * *